(No Model.)
B. C. HICKS.
STOCK CAR DOORWAY BRIDGE.
No. 429,915. Patented June 10, 1890.
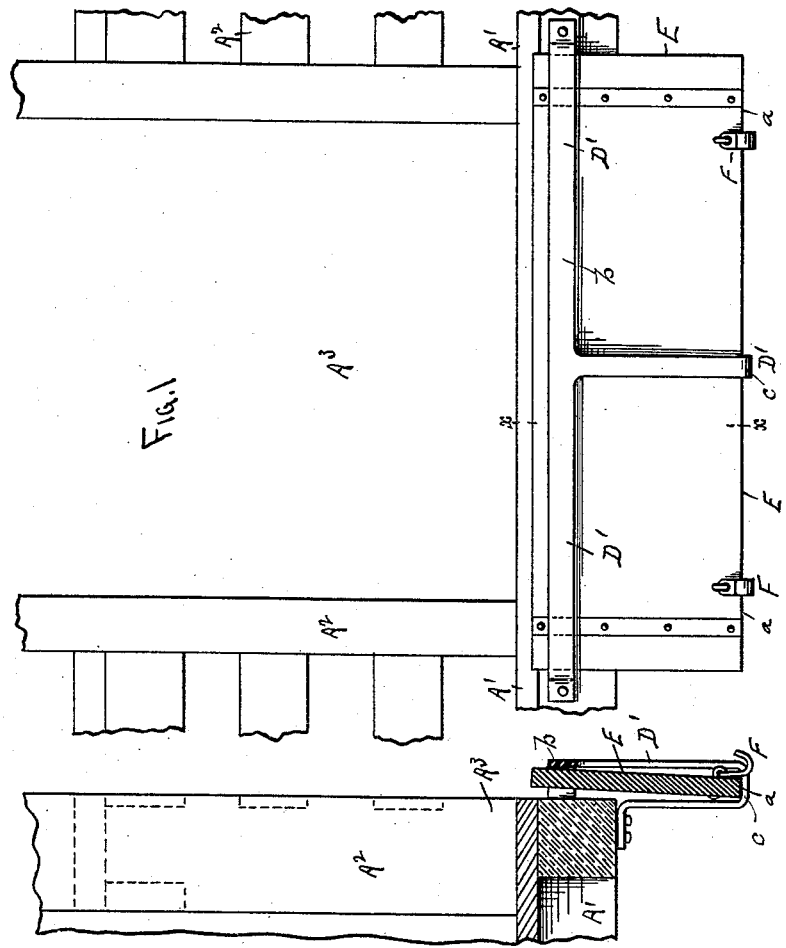
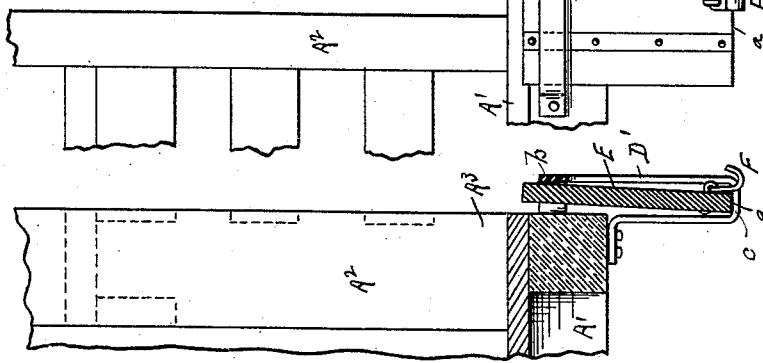
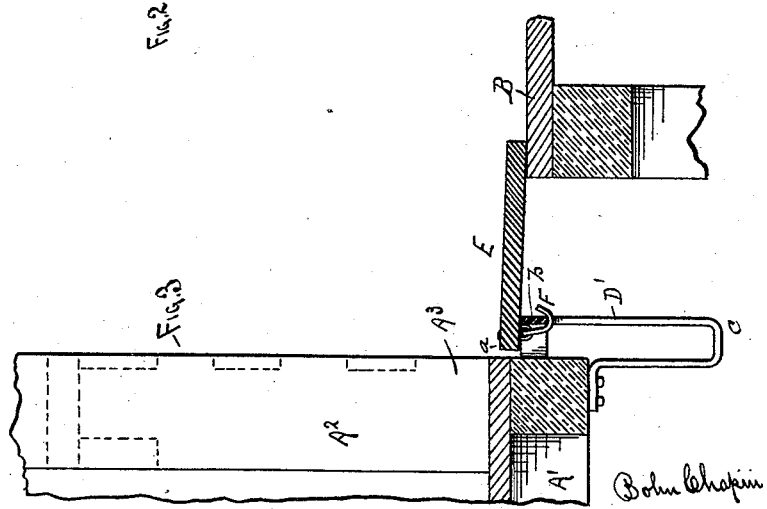
WITNESSES.
H. S. Webster
A. E. Kuester
John Chapin Hicks
INVENTOR, BY
Charles N. Woodward
Atty.

UNITED STATES PATENT OFFICE.

BOHN CHAPIN HICKS, OF MINNEAPOLIS, MINNESOTA, ASSIGNOR, BY MESNE ASSIGNMENTS, TO THE HICKS STOCK CAR COMPANY, OF WEST VIRGINIA.

STOCK-CAR-DOORWAY BRIDGE.

SPECIFICATION forming part of Letters Patent No. 429,915, dated June 10, 1890.

Application filed November 8, 1889. Serial No. 329,610. (No model.)

*To all whom it may concern:*

Be it known that I, BOHN CHAPIN HICKS, a citizen of the United States, residing at Minneapolis, in the county of Hennepin and State of Minnesota, have invented certain new and useful Improvements in Adjustable Gang-Planks for the Doorways of Stock-Cars, of which the following is a specification.

This invention relates to stock-cars; and it consists in the means for supporting an adjustable gang-plank upon the car opposite its doorway-openings, said gang-plank being arranged to be projected across the space between the car and the loading or unloading platform to form a bridge for the support of the animals when passing to or from the cars.

The improved gang-plank supports are illustrated in the accompanying drawings, wherein—

Figure 1 is a side elevation of a portion of a cattle-car, including one of its doorway-openings provided with the present improvements. Fig. 2 is a cross-sectional view on the line $x\,x$ of Fig. 1, showing the gang-plank or bridge-frame in its normal inoperative position; and Fig. 3 is a similar view showing the gang-plank or bridge-frame projected outward in position for use.

A' is the floor-frame, A² the side frame, A³ one of the doorway-openings, and B a section of one of the platforms to or from which the cattle are transferred, these parts being of the usual construction.

Attached to the side of the floor-frame opposite the doorway-openings is a downwardly-projecting hanger-frame D', behind and by which the gang-plank or bridge-frame E is supported, as shown in Figs. 1, 2, and 3 in the drawings. This hanger-frame includes as its essential features a horizontal retaining-bar $b$ at its top and a supporting-loop $c$ at its bottom.

The gang-plank or bridge-frame E may be formed in one or more pieces, as preferred.

When not in use, the gang-plank simply rests in a vertical position in the hanger D', being supported by the loop $c$ and bar $b$ entirely out of the way of the door or other parts, and does not interfere in any manner with the operation of the car, and then when it is to be used it is only necessary to raise it up and draw it outward with its upper or outer edge resting on the platform B, as in Fig. 3, and its inner edge resting on the bar $b$, in which position it forms a gang-plank for the passage of the animals to or from the car.

To maintain the gang-plank in its outward operative position and prevent it from slipping from the hanger D', I connect to it, near the lower or inner edge $a$, two or more hooks F, which hang loosely from the gang-plank when not in use, but which catch beneath the upper cross-bar $b$ of the hanger D' when the plank is elevated, as in Fig. 3, and thus firmly secure the inner end and prevent its removal. This is a very simple and effective fastening, and by its extreme simplicity will not get out of order or allow the gang-plank to become displaced. The hooks F are of such a form and length as to effectually prevent the removal of the gang-plank from the hanger-frame while they are in place, thereby serving the double purpose of hooks to support the inner end of stops to prevent the gang-plank from becoming detached from the car.

It will be noted that in using the gang-plank it is first lifted up vertically above the level of the platform B, and is then swung down upon the platform, so that its operation is not at all interfered with by the close proximity of the platform to the body of the car.

I claim as my invention—

In a stock-car, a gang-plank-supporting hanger suspended from the car-body beneath the doorway-opening, in combination with a gang-plank resting within said hanger and arranged to be brought into operative position by lifting it from said hanger and swinging it down upon a loading and unloading platform, and hooks connected to said gang-plank which engage said hanger when said gang-plank is in operative position and prevent the removal of the gang-plank from the car, substantially as set forth.

In testimony whereof I have hereunto set my hand in the presence of two subscribing witnesses.

BOHN CHAPIN HICKS.

Witnesses:
C. N. WOODWARD,
H. S. WEBSTER.